United States Patent
Xianggang et al.

(10) Patent No.: US 7,479,912 B1
(45) Date of Patent: Jan. 20, 2009

(54) LOW-POWER HIGH-PERFORMANCE AUDIO DAC SYSTEM INCLUDING INTERNAL OSCILLATOR, FIFO MEMORY, AND ASRC

(75) Inventors: Shawn Xianggang, Austin, TX (US); Mark S. Toth, Murphy, TX (US); Terry L. Sculley, Frisco, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/900,760

(22) Filed: Sep. 13, 2007

(51) Int. Cl.
*H03M 1/66* (2006.01)
(52) U.S. Cl. ................ 341/144; 341/61; 341/100
(58) Field of Classification Search ............ 341/144, 341/61, 100, 143, 155
See application file for complete search history.

(56) References Cited

U.S. PATENT DOCUMENTS

| | | | | |
|---|---|---|---|---|
| 4,048,657 A | * | 9/1977 | Knuth | ............ 358/412 |
| 5,255,370 A | * | 10/1993 | Sako et al. | ............ 710/52 |
| 6,522,731 B2 | * | 2/2003 | Matsumoto | ............ 379/93.08 |
| 2004/0120361 A1 | | 6/2004 | Yu et al. | ............ 370/545 |

* cited by examiner

*Primary Examiner*—Peguy JeanPierre
(74) *Attorney, Agent, or Firm*—Wade J. Brady, III; Frederick J. Telecky, Jr.

(57) ABSTRACT

A low-power data conversion system for converting a serial digital data input signal (DIN) to an analog output signal (Vout) by generating the serial digital data input signal (DIN) at a first sample rate (fsin) in a burst mode, wherein the sampling frequency of the serial digital data input signal (DIN) has a predetermined ratio to the frequency of an external reference clock signal (SLEEPCLK or WCLK). The serial digital data input signal (DIN) is converted into parallel format. A FIFO system temporarily stores a predetermined number of samples (Din) of the parallel format digital data input signal. The samples (Din) have a first sample rate (fsin). The samples (Din) are converted to an analog output signal (Vout).

20 Claims, 6 Drawing Sheets

LOW-POWER HIGH-PERFORMANCE AUDIO DAC SYSTEM INCLUDING INTERNAL OSCILLATOR, FIFO MEMORY, AND ASRC

BACKGROUND OF THE INVENTION

The present invention relates generally to low power audio DAC systems, for example, audio DAC systems adapted to be used in portable audio systems to play back digital audio data in analog format (for example by decoding it from compressed MP3 format or by receiving it in PCM (pulse code modulation) format supplied by a digital signal processor), while minimizing power consumption. The invention also relates more particularly to such audio DAC systems which include a sample rate converter in an audio digital to analog converter ("audio DAC") wherein the audio DAC is not required to be locked in synchronization with the sampling rate of the audio input data.

Audio digital to analog converters (DAC) are widely used in various applications, such as cell phones and MP3 players, wherein the digital audio samples are played back by means of speakers and/or headphones. Because audio signals are increasingly stored and processed in digital format, the number of applications of audio DACs are increasing.

Normally, a digital signal processor performs a decoding if the original audio data are compressed, and then processes and transfers the decoded and processed audio data to the audio DAC continuously at the audio data sampling rate. The audio DAC receives the audio data and plays it at a rate derived from the externally provided operating clock rate. Typically, the operating clock rate is 512, 256 or 128 times the audio sampling rate. The DSP (digital signal processor) can operate very fast, so it does not have to run continuously to accomplish the required decoding and processing tasks. Unfortunately, the continuous audio data transfer from the DSP to the audio DACs of the prior art requires that the DSP remain in a "powered up" mode even though there are not any other actions presently required to be performed by the DSP. Under these conditions, circuitry and associated software not related to the audio data transfer from the DSP continue to consume and therefore waste power.

An audio DAC ordinarily consists of two parts, including a digital processing circuit which interpolates (and sometimes performs other processing on) the incoming audio data. The interpolated data may be processed by a digital delta-sigma modulator, the output of which typically is provided as an input to an analog DAC. In conventional audio DACs, the audio data is interpolated by multi-stage interpolation filters and then is fed into a digital delta-sigma modulator. The digital delta-sigma modulator is used to reduce the audio data word width and push quantization noise out of the audio band to reduce distortion caused by nonlinearity of an analog DAC section of the audio DAC. The reduced width audio data words are converted into analog signals by the analog DAC.

Various analog audio sources often are sampled at various different sample frequencies and the sampled signals then are digitized to produce various audio signals which can be readily edited, reproduced and processed easily in digital format without introducing nearly as much distortion and noise as would be introduced if the same editing, reproducing and processing were to be performed on the same audio signals in analog format.

Ordinarily, audio DACs operate at clock signal rates that are locked in synchronization with the digital audio input sampling rates, in order to avoid pitch shift artifacts. The effect of the pitch shift artifacts is that the tone at the analog output is not exactly at the frequency it is supposed to be. For example, if the DAC is operating at 48.5 kHz while playing a 1 kHz tone recorded at 48 kHz, the tone at the DAC output will be 1.01 kHz instead of 1 kHz. There are several typical sampling rates for digital audio data, so clock signals related to those typical sampling rates need to be available for clocking the audio DAC to enable it to "play back" the received digital audio at different audio sampling rates. To achieve high quality audio output, the clock signals being utilized need to have low jitter. The jitter of the DAC clock has an FM modulation effect on the audio signals. For example, if the jitter is sinusoidal and the playback audio signal is a tone, there will be two "side tones" at each side of the main audio tone, and the distance of each side tone to the main audio tone is equal to the jitter frequency. In some applications, it is difficult to provide analog DAC clock signals that meet the foregoing requirements. That is, a low jitter clock signal which has a frequency related to the audio sampling rate is not conveniently available in some applications.

Normally, in the prior art a clock signal having a frequency that is directly related to the sampling rate is needed. Otherwise, a PLL (phase locked loop) must be used to generate a sampling-rate-related clock signal from a clock signal that is not directly related to the sampling rate. However, it would be highly desirable for some audio DAC applications that any reference signal, such as the output of a free-running oscillator, could be used for controlling the operating rate of the analog DAC section of an audio DAC.

Sample rate converters are necessary for interfacing between devices receiving and/or producing digital signals having different sample rates, in order to avoid audio sample dropping or sample repeating which results in highly undesirable audible "popping" or "clicking" sounds. Even for two devices that receive and/or produce digital signals having the same nominal sample rates but which are based on two asynchronous clocks, it is necessary to use an asynchronous sample rate converter to accomplish interfacing between the two devices in order to avoid audio sample dropping or repeating.

In asynchronous sample rate converters it is not necessary that the sample rate of the output signal be synchronized with the sample rate of the input signal. Asynchronous sample rate converters each receive a stream of input samples, process them, and produce output samples when requested, and can be used to convert between any two sample rates irrespective of whether the ratio of the two sample rates is an integer or is a rational number, and irrespective of whether the two sample rates are synchronized.

Because of this feature, an asynchronous sample rate converter can decouple a first digital audio device producing a digital output having a first sample rate from a second digital audio device which is intended to receive the output of the first digital audio device and sample it at a second sample rate. For example, the sample rate of an audio source device might be 48 kHz, and the desired sample rate for an audio destination device might also be 48 kHz, but the clock signals of the audio source device and the audio destination device might be independent and therefore asynchronous. In this case, even though the nominal sample rates both are 48 kHz, a very small drift or difference between the frequencies of the two above-mentioned 48 kHz clock signals will accumulate and cause the above-mentioned undesirable/annoying sample dropping or sample repeating if a synchronous sample rate converter is used.

One asynchronous sample rate converter is disclosed in the assignee's co-pending patent application "ASYNCHRONOUS SAMPLE RATE CONVERTER AND METHOD" Ser. No. 10/325,202, filed Dec. 20, 2002 by Xianggang Yu, Terry L. Sculley and Jung-Kuei Chang, Published Jun. 24, 2004 as Publication No. US 2004/0120361 A1.

There is an unmet need for a way to reduce power consumption of a system including an audio DAC system and a host processor such as a DSP.

There also is an unmet need for a way to avoid the need to continuously maintain a DSP of a system including an audio DAC system and the DSP in a powered up mode.

There also is an unmet need for a way to provide improved flexibility in the transfer of audio data from a DSP to an audio DAC system.

SUMMARY OF THE INVENTION

It is an object of the invention to provide a way to reduce power consumption of a system including an audio DAC system and a host processor such as a DSP.

It is another object of the invention to provide a way to avoid the need to continuously maintain a DSP system including an audio DAC system and the DSP in a powered up mode.

It is another object of the invention to provide an audio DAC system and method which reduce the power consumption of a system including the audio DAC system.

It is another object of the invention to provide improved flexibility in the transfer of audio data from a DSP to an audio DAC system.

Briefly described, and in accordance with one embodiment, the present invention provides a low-power data conversion system for converting a serial digital data input signal (DIN) to an analog output signal (Vout) by generating the serial digital data input signal (DIN) at a first sample rate (fsin) in a burst mode, wherein the sampling frequency of the serial digital data input signal (DIN) has a predetermined ratio to the frequency of an external reference clock signal (SLEEPCLK or WCLK). The serial digital data input signal (DIN) is converted into parallel format. A FIFO system temporarily stores a predetermined number of samples (Din) of the parallel format digital data input signal. The samples (Din) have a first sample rate (fsin). The samples (Din) are converted to an analog output signal (Vout).

In one embodiment, the invention provides a low-power data conversion system (10) for converting a serial digital data input signal (DIN) to an analog output signal (Vout), including a digital processor (110), the digital processor generating the serial digital data input signal (DIN) in a burst mode. A serial interface circuit (12) converts the serial digital data input signal (DIN) from serial format into parallel format, the digital processor (110) being in a high power mode while generating the serial digital data input signal (DIN) in the burst mode, the digital processor (110) being in a low power mode during at least some of the time during which the digital processor (110) is not generating the serial digital data input signal (DIN). A FIFO (first in, first out) system (15) for receives and temporarily stores a predetermined number of samples (Din) of the parallel format digital data input signal, the samples (Din) having a first sample rate (fsin). An audio DAC (30) is coupled to receive the samples (Din) having a second sample rate (32fsout) and convert them to the analog output signal (Vout). A clock generation system (11) establishes timing of various clock signals for the serial interface circuit (12), the FIFO system (15), and the audio DAC (30). The first sample rate (fsin) is established by a predetermined ratio between an external reference clock rate and the first sample rate (fsin).

In one embodiment, low-power data conversion system includes an SRC (sample rate converter) (32) coupled to sequentially receive the samples (Din) having the first sample rate (fsin) from the FIFO system (15) and reproduces them as samples with the second sample rate (32fsout).

In one embodiment, the clock generation system (11) includes a free-running oscillator (63) which establishes the timing of the various clock signals for the serial interface circuit (12), the FIFO system (15), the SRC (32) and the audio DAC (30).

In the described embodiment, the serial digital data input signal (DIN) is an audio data signal, and wherein the digital processor (110) is a DSP (digital signal processor). The SRC (32) is an asynchronous sample rate converter. The FIFO system (15) includes a first FIFO memory and is coupled to the serial interface circuit (12), the FIFO system (15), and the SRC (32) for notifying the serial interface circuit (12) when to transfer groups of a predetermined number (N) of samples of the serial digital data input signal (DIN) to the FIFO system (15). The serial interface circuit (12) accepts the predetermined number (N) of samples of the serial digital data input signal (DIN) from the digital processor (110) for each burst and then temporarily stops accepting those samples and transfers the accepted samples to the FIFO system (15). An interpolation circuit (31) is coupled between the SRC (32) and the FIFO system (15), wherein when the interpolation circuit (31) needs more of the samples in parallel format (Din) it sends a need sample signal (NEED SAMPLE) to the FIFO system (15), and wherein the interpolation circuit (31) up-samples the samples in digital format (Din) to produce a signal having a third sample rate (32fsin) as an input to the SRC (32). In the described embodiment, a volume control circuit (20) is coupled between the interpolation circuit (31) and the FIFO system (15).

In a described embodiment, an I$^2$C bus is coupled to the DSP (110) and an I$^2$C interface circuit (27) coupled between the I2C bus and various conductors conducting various set-up signals and multiplexer selection signals to effectuate operation of the low-power data conversion system (10).

In a described embodiment, the free-running oscillator system (63) is calibrated to an external reference signal (SLEEPCLK or WCLK) which can be either synchronous or asynchronous with respect to the serial data input signal (DIN). The digital processor (110) is capable of presenting the serial digital input data signal in a continuous mode, the low-power data conversion system including means (13,17,20,21,30) coupled between the serial interface circuit (12) and the SRC (32) for bypassing the FIFO system (15) if the digital input data signal (DIN) is in the continuous mode.

In the described embodiment, the SRC is an asynchronous SRC capable of receiving the samples (Din) at the first sample rate (32fsin), wherein the asynchronous SRC a first estimating circuit (32A) receiving a reference clock signal (REFCLK) and a first clock signal (MCLK1) unrelated to the reference clock signal (REFCLK) for generating a first signal (TR) in synchronization with the first clock signal (MCLK1) and representative of a period of the reference clock signal (REFCLK) and for generating a second signal (STAMPR) in synchronization with the first clock signal (MCLK1) and representative of a time of arrival of a particular edge of the reference clock signal (REFCLK). The asynchronous SRC also includes a second estimating circuit (32B) for operating on the first signal (TR), the second signal (STAMPR), and an input value (RATIO) which represents a predetermined ratio of the frequency (1/TR) of the reference clock signal (REFCLK) divided by the first sample rate (fsin) to generate a third signal (T1) which represents a period of the first sample rate (32fsin) and a fourth signal (STAMP1) that represents a time of arrival of a group of sample of the digital input data (Dinf). A coefficient and address generation circuit (76) receives the third (T1) and fourth (STAMP1) signals for generating a read address signal and a coefficient signal (coef). A second FIFO memory (42) has an input coupled to receive the digital input signal (Dinf) and a read address input receives the read address signal. A multiplication/accumulation circuit (78) receives the coefficient signal (coef) and digital data samples output by the second FIFO memory (42), multiplies the digital data samples output from the second FIFO memory (42) by corresponding coefficients (coef) output by the coefficient and address generation circuit (76), accumulates resulting multiplication products, and produces a digital output signal (SRC-out) including accumulated multiplication products and having an output sample rate equal to the second sample rate (32$f_s$out) that is synchronized with the first clock signal (MCLK1).

In one embodiment, the invention provides a method for reducing power consumption required for converting a serial digital data input signal (DIN) to an analog output signal, the method including generating the serial digital data input signal (DIN) at a first sample rate (fsin) in a burst mode, wherein the serial digital data input signal (DIN) has a predetermined ratio to an external reference clock signal (SLEEPCLK or WCLK), converting the burst mode serial digital data input signal (DIN) into parallel format, the digital processor (110) being in a high power mode while generating the serial digital data input signal (DIN) in the burst mode, the digital processor (110) being in a low power mode during at least some of the time during which the digital processor (110) is not generating the serial digital data input signal (DIN), temporarily storing a predetermined number of samples (Din) of the parallel format digital data input signal in a FIFO system (15), the samples (Din) having a first sample rate (fsin), converting the samples (Din) to an analog output signal (Vout), and establishing timing of various clock signals for the serial interface circuit (12), FIFO system (15), and audio DAC (35) based on a particular clock signal. The samples (Din) are reproduced with a third sample rate (32$f_s$out) by means of a SRC (sample rate converter) (32). The particular clock signal (OSCLK) is generated by means of an on-chip free-running oscillator (63) which is calibrated to an external reference signal (SLEEPCLK or WCLK). The samples (Din) with a second sample rate (32$f_s$out) are reproduced by means of an asynchronous SRC (sample rate converter) (32).

In one embodiment, the invention provides low-power data conversion system for converting a serial digital data input signal (DIN) to an analog output signal (Vout), including means (110) for generating the serial digital data input signal (DIN) at a first sample rate (fsin) in a burst mode, wherein the serial digital data input signal (DIN) has a predetermined ratio to an external reference clock signal (SLEEPCLK or WCLK), means (12) for converting the burst mode serial digital data input signal (DIN) into parallel format, the digital processor (110) being in a high power mode while generating the serial digital data input signal (DIN) in the burst mode, the digital processor (110) being in a low power mode during at least some of the time during which the digital processor (110) is not generating the serial digital data input signal (DIN), FIFO means (15) for temporarily storing a predetermined number of samples (Din) of the parallel format digital data input signal, the samples (Din) having a first sample rate (fsin), means (35) for converting the samples (Din) to an analog output signal (Vout), and means (11) for establishing timing of various clock signals for the serial interface circuit (12), FIFO means (15), and audio DAC (35) based on a particular clock signal.

DETAILED DESCRIPTION OF THE PREFERRED EMBODIMENTS

Figure 1:
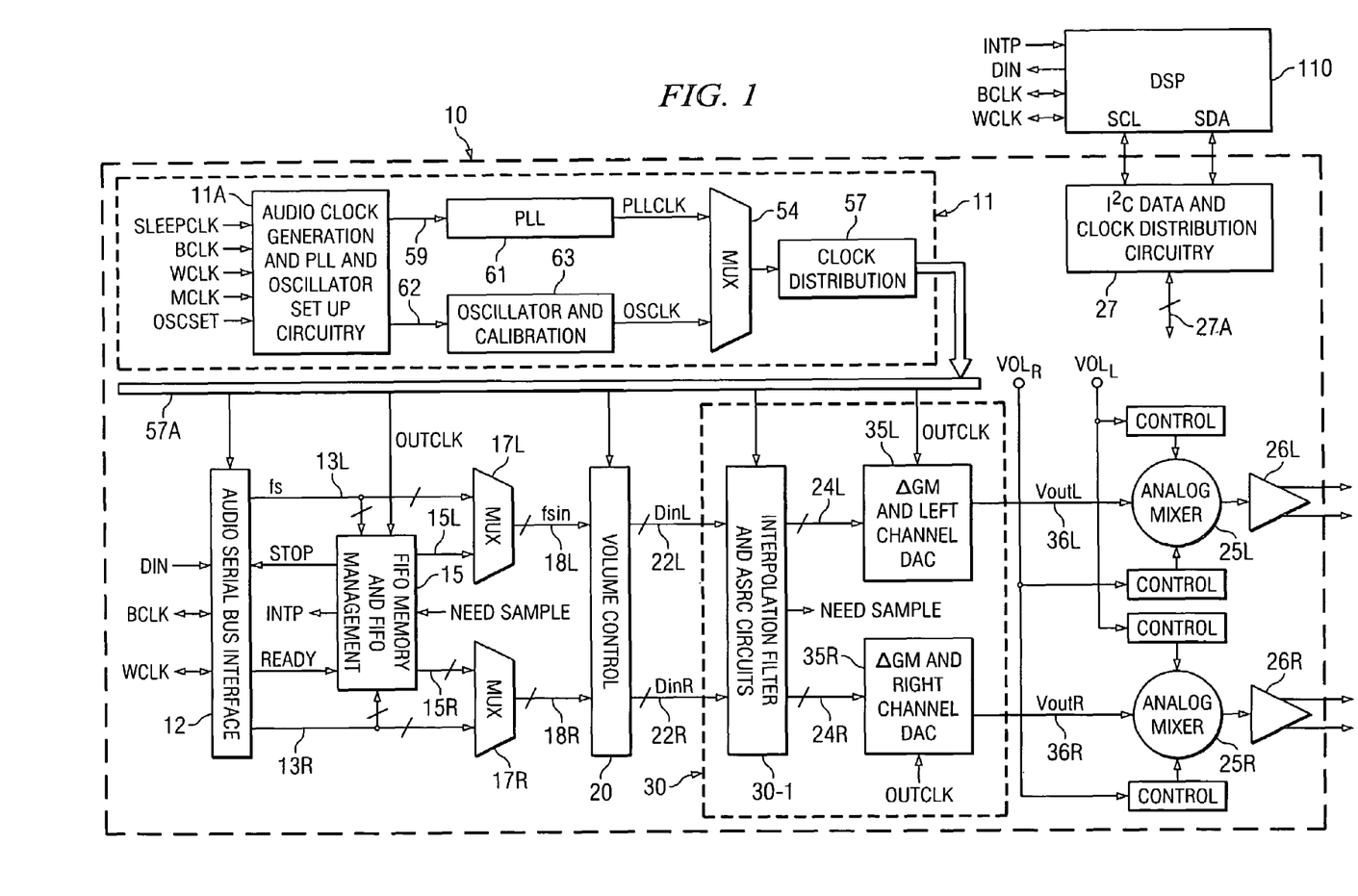
FIG. 1 is a block diagram of a low-power audio DAC system of the present invention.

Referring to FIG. 1, audio DAC system 10 includes an audio clock signal generation and calibration system 11 which receives a reference clock signal SLEEPCLK and a master clock MCLK. Audio clock signal generation and calibration system 11 includes PLL and oscillator calibration set up circuitry 11A coupled by conductor 59 to an optional phase locked loop (PLL) 61 and coupled by conductor 62 to a free-running oscillator and oscillator calibration system 63. PLL 61 is provided as an alternative to the use of free-running oscillator and oscillator calibration system 63, hereinafter sometimes referred to simply as "oscillator system 63". A "bit clock" BCLK and a "word clock" WCLK are provided as inputs to audio clock generator and calibration system 11A. A signal OSCSET is also provided as an input to audio clock generation and PLL & oscillator setup circuitry 11A. The functions of the PLL and OSC calibration setup circuitry in block 11A include selecting the reference clock and determining the feedback clock divide ratios for the PLL and the calibration reference clock, and also determining the ratio for the OSCCLK rate to the reference clock rate for oscillator 63.

Oscillator system 63 produces an output clock signal OSCLK and applies it to one input of a multiplexer 54. The output of optional PLL 61 is connected to another input of multiplexer 54. Audio clock signal generation and calibration system 11 also includes clock signal distribution circuitry 57 which generates various clock signals on various conductors 57A in response to the output of multiplexer 54, in order to provide the needed clock signals to various components of audio DAC system 10, respectively. Calibration circuitry in blocks 11A and 63 operates to calibrate the clock frequency of OSCLK generated by free-running oscillator system 63 to a desired value by using SLEEPCLK or WCLK as a reference during an initial calibration phase of the circuit operation.

Audio DAC system 10 also includes audio serial bus interface 12. The outputs 13L and 13R of audio serial bus interface 12 are connected to corresponding inputs of FIFO memory and FIFO management system 15 (hereinafter also referred to as "FIFO system 15") and also to first inputs of multiplexers 17L and 17R. Audio serial bus interface 12 converts the stereo serial audio data DIN to parallel-formatted left channel data and right channel data. For example, BCLK determines when audio serial port circuit 12 samples DIN data. The serial audio data comes in and is received by the audio serial bus interface 12 and is converted into parallel format and then put into FIFO system 15. The number of BCLK cycles for either the left channel or right channel has to be equal to or greater than the number of bits of audio data for that channel. For example, if there are 24 bits each for the left or right audio data, the number of BCLK cycles has to be at least 24. The channel of the audio data is indicated by the level of WCLK. If there are more BCLK cycles than the number of bits, the bits of the extra BCLK cycles will be ignored by the audio serial interface 12 since they are not part of the audio data. As a result, the rate of BCLK is equal to or greater than the number of total audio bits for the left and right channels multiplied by the sampling rate. For example, if there are 24 bits for each channel, the rate of BCLK should be 48$fs$ or faster, e.g., 64$fs$. In the later case, 64−48=16 bits of DIN are ignored.

The left channel output 15L and right channel output 15R of FIFO system 15 are connected to second inputs of multiplexer 17L and 17R, respectively, for burst mode operation. The audio data is input to FIFO system 15, and in the burst mode operation, the playback data from the output of FIFO system 15 is selected by multiplexers 17L and 17R. However, in continuous or regular mode, the playback data is selected directly by multiplexers 17L and 17R directly from audio buses 13L and 13R.

Ordinarily, the frequency of word clock WCLK is the same as the audio input sample rate. In burst mode, the WCLK rate is much higher than the sampling rate, fs, for example, 10 times higher. In the regular mode, it would be exactly the same as the sampling rate. For example, if the audio input sample rate is 48 kHz, then the frequency of WCLK will be 48 kHz. That means there will be one cycle of WCLK for each stereo pair of samples.

Audio serial bus interface 12 converts the serial format of the audio data into parallel data and feeds it into FIFO system 15. There is a full handshaking process between audio serial bus interface 12 and FIFO system 15. Whenever audio serial port circuit 12 has one sample stereo pair of DIN data, it will send out a data ready signal "READY" to FIFO system 15 to let it know that a stereo data sample pair is ready to be accepted by FIFO system 15, which then accepts the data sample pair. As the serial data DIN arrives at high speed, at some point FIFO system 15 may be unable to accept additional sample pairs as fast as they arrive, and in this case it generates a stop signal STOP to cause audio serial port circuit 12 to temporarily stop accepting data until the end of the signal STOP.

The 128$fs$out clock signal OUTCLK sets the analog DAC playback sampling rate, which is determined/derived from one of several sources, as subsequently explained. Therefore, fsout is normally different than fsin. OUTCLK is received and used by the FIFO management circuitry in FIFO system 15 for its operation. The FIFO management circuitry in block 15 receives the audio samples from the audio serial port and loads them into the FIFO memory in block 15, and sends out the samples from FIFO system 15 in response to a request NEED SAMPLE from the interpolation filter in block 30-1. There is no specific requirement for the clock frequency, and the foregoing 128$fs$out clock signal is suitable. FIFO system 15 generates the interrupt signal INTP.

Audio serial bus interface 12 receives the serial digital data DIN, and can operate to receive the serial audio data DIN in either the above mentioned "burst mode" or a "continuous mode". The size of the FIFO memory in FIFO system 15 can be configured according to the audio data word width so as to maximize the storage capacity Multiplexer outputs 18L and 18R are connected to left channel and right channel inputs, respectively, of a conventional digital volume control circuit 20. Burst mode outputs 22L and 22R of volume control circuit 20 apply left channel digital audio signal DinL and right channel digital audio signal DinR, in parallel format, to corresponding inputs of interpolation filter circuitry in block 30-1.

Interpolation circuitry in block 30-1 generates the above mentioned "NEED SAMPLE" signal which is provided as an input to FIFO memory and FIFO management system 15 to inform it that the next sample of audio input data DinL and DinR is needed.

Asynchronous SRC (ASRC) circuitry in block 30-1 produces corresponding left channel audio data 24L and corresponding right channel audio data 24R to corresponding inputs of left channel DAC 35L and right channel DAC 35R, respectively. DAC circuits 35L and 35R are conventional, and each includes a stereo digital delta-sigma modulator and provides a stereo digital to analog converter.

The left channel DAC output VoutL on conductor 36L can be applied to one input of a conventional analog mixer 25L and can be mixed in a conventional manner with analog volume control signals produced by conventional analog volume control circuits CTRL in response to analog volume control signals $VOL_L$ and $VOL_R$, as shown. Similarly, the right channel DAC output VoutL on conductor 36R can be applied to one input of analog mixer 25R and can be mixed in a conventional manner with analog volume control signals produced by conventional analog volume control circuits CTRL in response to analog volume control signals $VOL_L$ and $VOL_R$. The outputs of analog mixers 25L and 25R are connected to the inputs of conventional analog driver circuits 26L and 26R which generate differential, volume-controlled left channel and right channel audio signals, respectively.

The above-mentioned clock signal OUTCLK is applied to clock input terminals of and audio DACs 35L and 35R (as shown in subsequently described FIGS. 2 and 3).

Audio serial bus interface circuit 12 receives a serial digital audio input signal DIN from a host processor, which can be a conventional DSP 110. In the described example, DSP 110 is coupled by serial data bus conductor SDA and a serial clock signal conductor SCL to a conventional I²C bus interface circuit 27, which produces various control signals 27A that are applied to the various blocks in audio DAC system 10 in order to coordinate their operation with DSP 110. Conductors 27A are coupled to all registers (not shown) and multiplexer needed to set up audio DAC system 10, for example to set up the format for the input serial interface, the number of samples in each burst, the upper threshold and lower threshold in the interrupt mode, and other programmable features of the control interface, etc. (However, a control interface other than an I²C interface could be used. Also, more than one processor or DSP can be used, for example, one to handle the control data communication to and from audio DAC system 10 and the other to handle the transmission of audio data to audio DAC system 10.)

In FIG. 1, DSP 110 is connected to generate the serial audio digital data signal DIN and to receive an interrupt signal INTP. DSP 110 also can generate and receive a bidirectional "bit clock" signal BCLK and a bidirectional "word clock" signal WCLK. Bit clock BCLK is used as a clock to sample each bit of serial audio data, and word clock WCLK is used in a power-saving mode or powered down mode wherein each serial data word DIN comes in during one cycle of WCLK in the above mentioned burst mode. In the burst mode, the serial data DIN may come in at very fast, irrregular speeds. As it relates to the present invention, DSP (digital signal processor) 110 performs the functions of decoding the compressed audio data, for example, MP3 audio, and in a wireless application, DSP 110 can be used to obtain the base band voice data by demodulation and signal processing. (Note that for flexibility, audio DAC system 10 also can handle the incoming audio data in a "regular mode", i.e., at a fixed speed, in which case WCLK rather than SLEEPCLK can be used with as the reference clock REFCLK. However, the power-saving benefits of the present invention are not achieved in the "regular mode".)

Interpolation filter 31 and asynchronous SRC 32 in block 30-1 of FIG. 1 receive the left-channel and right-channel signals, at a sample rate fsin, from FIFO system 15. After each time that interpolation filter 31 and asynchronous SRC 32 in block 30-1 receive and process the left and right channel data, the above mentioned NEED SAMPLE a "need data" signal is sent to FIFO system 15 when interpolation filter and ASRC circuitry in block 30-1 needs more data. Each time, the interpolation filter "grabs" a pair of stereo samples which originate from FIFO system 15, it will notify the FIFO management circuit by toggling the NEED SAMPLE signal such that the FIFO management circuit can prepare the next pair of the stereo sample for the interpolation to "grab".

Note that some of the circuitry in blocks 11 and 30-1 of FIG. 1 is disclosed in more detail in the assignee's pending published patent application "Asynchronous Sampling Rate Converter and Method for Audio DAC", Ser. No. 11/726,414, filed Mar. 22, 2007 by the present inventors Shawn Xianggang Yu and Terry L. Sculley, and incorporated herein by reference.

Figure 2:
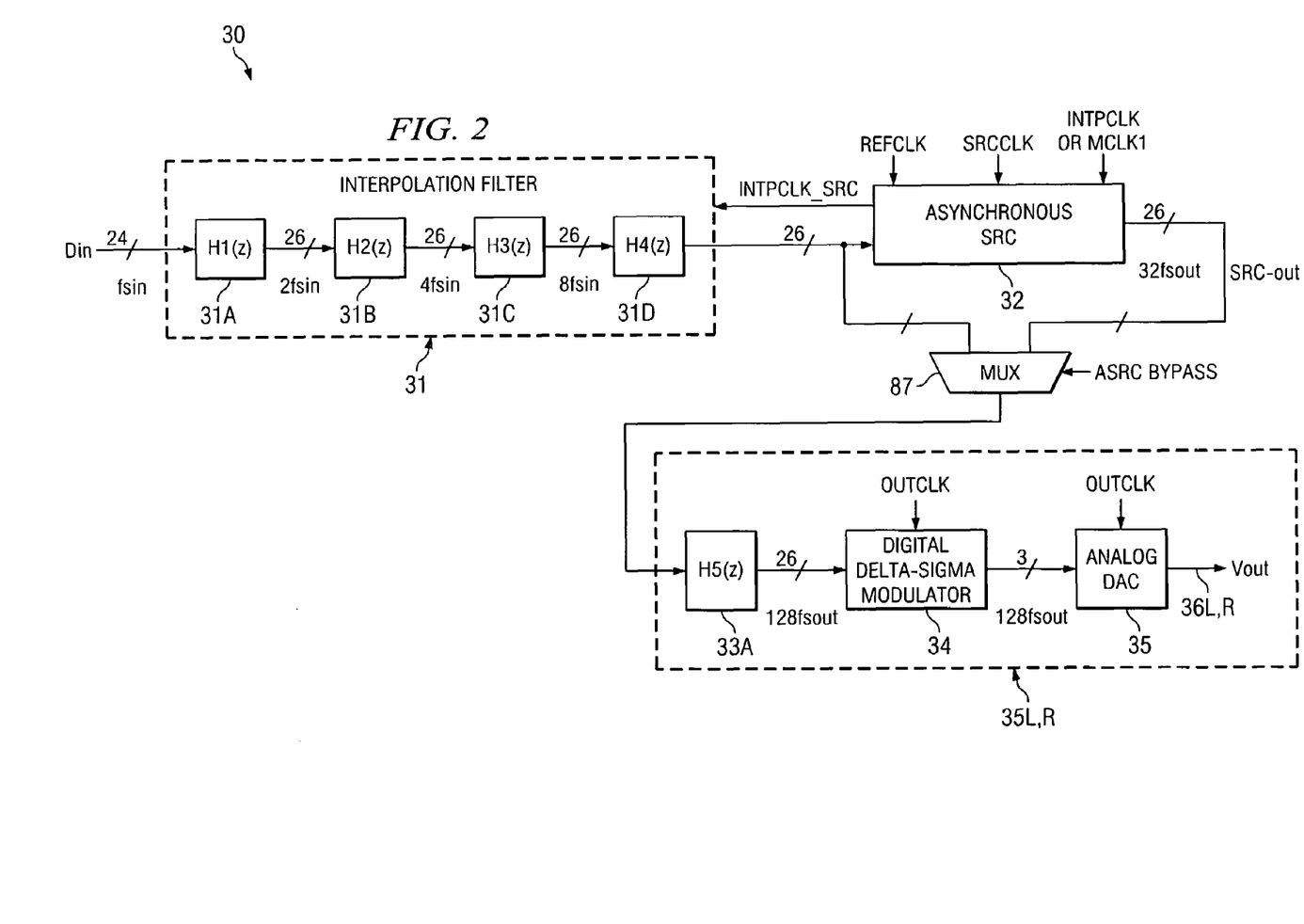
FIG. 2 is a block diagram of a basic audio DAC included in block 30 of FIG. 1.

FIG. 2 shows in more detail how each of the foregoing left channel audio DAC and right channel audio DAC are implemented, with either DinL or DinR being represented simply by Din. Referring to FIG. 2, interpolation filter 31 of audio DAC 30 in FIG. 1 includes 4 interpolation stages 31A, 31B, 31C, and 31D having the transfer characteristics $H1(z)$, $H2(z)$, $H3(z)$, and $H4(z)$, respectively, which operate to increase the sampling rate of the 24-bit parallel data input signal Din from fsin to $32fs$in. Block 33A in FIG. 2 performs a zero order hold function. The output of interpolation stage 31D is connected to the input of asynchronous SRC 32, the output of which, in the described example, is a 26-bit signal having a sampling rate of $32fs$out. The output of asynchronous SRC 32 is applied to the input of zero order hold stage 33A, which has a transfer characteristic $H5(z)$. The output of interpolation stage 33A is applied to the input of digital delta-sigma modulator 34, the output of which is a 3-bit or 4-bit word that is applied to the input of analog DAC 35, which can be either analog DAC 35L or 35R of FIG. 1. Analog DAC 35 produces corresponding output signal Vout, which can be fed into analog mixer 25L or 25R or can be fed directly into suitable analog output circuitry, as desired. (The number of taps for the various filters in FIG. 2 can vary for different applications.) More detail of the structure and operation of the circuitry shown in FIG. 2 is set forth in above-incorporated-by-reference published application Ser. No. 11/726,414.

Interpolation filter 31 up-samples the 24-bit digital input data signal Din from an audio input sample rate fsin to produce a 26-bit signal with a sample rate of $32fs$in, z being the operator of a z transform for discrete-time systems and signals. The output of interpolation circuit 31 is applied to the input of asynchronous SRC 32, which is clocked by REFCLK signal of subsequently described with reference to FIG. 3 and can be derived from the 32.768 kHz clock signal SLEEPCLK commonly used in cell phones or the word clock WCLK from audio serial interface 12. SRC 32 also is clocked in response to the clock signal OSCLK generated by on-chip oscillator 63, and converts its input signal sample rate $32fs$in to an output sample rate $32fs$out. The sample rate $32fs$in at the output of the 26-bit output of interpolation circuit 31 and the 26-bit output sample rate $32fs$out of asynchronous SRC 32 are asynchronous, meaning that there is no fixed ratio between the two.

The 26-bit output of asynchronous SRC 32 is connected to the input of interpolation circuit 33 with its transfer characteristic $H5(z)$ representing the zero order hold (ZOH) interpolation filter function wherein its input signal is up-sampled by a factor of 4 in this example to provide a 26-bit output signal with a sample rate of $128fs$out. (The zero order hold function provides a way to separate samples and is the easiest way to interpolate samples.) The 26-bit output of interpolation circuit 33A, with its sampling rate of 128fsout, is coupled to the input of a digital delta-sigma modulator, which operates to truncate the audio data received from interpolation circuit 33A. The output of digital delta-sigma modulator 34 is a 3-bit or 4-bit signal having a sample rate of 128fsout, which is applied to the input of analog DAC 35, the output of which produces the analog output signal Vout. (Most audio DACs include a digital delta-sigma modulator, and those skilled in the art can readily provide various suitable implementations thereof.)

Ordinarily, after Din has been processed by the sequence of interpolation filter 31, asynchronous SRC 32 and interpolation filter 33, the number of bits (i.e., the data width) in each sample of the resulting audio signal will be about 28-32. (The data width can be any number, subject to the requirement that it has to be wide enough to ensure the desired SNR (signal-to-noise ratio) and the desired THD (total harmonic distortion) performance.) The 28-32 bit audio signal should not be input directly to analog DAC 35 because of linearity problems typical of delta-sigma techniques.

The present invention provides two ways to save power. One way is to use the burst mode for transmission of audio data from DSP 110 to audio DAC system 10. The second way is based on the fact that a DSP normally provides the high frequency operating clock to an audio DAC system. However, that causes the problem of consuming a large amount of power because of parasitic capacitance associated with conductors that conduct the high frequency operating clock along a printed circuit board to the audio DAC system chip. The present invention overcomes this problem by providing the selected low frequency reference clock (SLEEPCLK or WCLK) to the integrated circuit chip on which audio DAC system 10 is formed and utilizes the free-running on-chip oscillator system 63 to generate the needed high frequency operating clock signal OSCLK clock inside the audio DAC chip.

In accordance with the present invention, the previously mentioned waste of power due to the host processor or DSP being continually fully powered up is avoided by providing FIFO system 15 in audio DAC system 10 of FIG. 1 and providing audio serial bus interface 12 with the capability of transferring the serial audio input data DIN from DSP 110 to audio DACs system 10 in the above mentioned burst mode. In burst mode operation, DSP 110 transfers the serial audio data DIN, at a much higher rate than the audio sampling rate, to audio serial bus interface 12 during an interval in which the DSP 110 is fully powered up and saves the transferred audio data in FIFO system 15. After interpolation and sampling rate conversion and after a sufficient number of DIN samples are transferred to allow audio DAC 30 of FIG. 1 to play back the audio information at the output sampling rate $128fs$out during the DSP power-down interval, portions of DSP 110 and audio DAC system 10 can be shut down while audio DAC system 10 continues to convert to analog and "play back" audio data which has been stored in FIFO system 15 of audio DAC system 10. DSP 110 "wakes up" just before audio DAC 30 finishes converting all of the DIN samples in FIFO system 15. The DSP wake up transition can be triggered by either a timer in DSP 110 or an interrupt signal INTP generated by the FIFO management circuitry in FIFO system 15. If "wakened" by the timer, DSP 110 still has to check the number of samples remaining in the FIFO memory in FIFO system 15 if the timer is not synchronized to the REFCLK signal (FIGS. 2 and 3) used by the ASRC in block 30-1. The reason is that any error caused by the timer reference clock relative to REFCLK will be accumulated to a sufficiently large positive or negative value or upper threshold that FIFO system 15 underflows or overflows. This problem will not occur if DSP 110 is wakened by the interrupt INTP from audio DAC system 10.

The above mentioned low frequency timing reference clock SLEEPCLK is provided to audio DAC 30 and free-running on-chip oscillator system 63 generates DAC operating clock $128f_s$out based on SLEEPCLK. The power consumption of oscillator system 63 can be very small, since its only requirement is that the jitter of DAC operating clock $128f_s$out be sufficiently low to achieve the needed DAC performance and its tuning range is just wide enough that the sampling rate will fall into the desired range for the given operating environment range variation.

To make the power saving operation simple, free-running oscillator clock signal OSCLK drives analog DACs 35L and 35R (FIG. 1) without any immediate adjustment after an initial calibration has been performed. To overcome problems of initially inaccurate oscillator frequency and drift of the oscillator clock signal frequency during normal operation, asynchronous SRC 32 is provided to convert the $32f_s$in sampling rate of the up-sampled digital audio data to the desired $32f_s$out DAC operating rate. During playback by audio DAC 30, the frequency of free-running oscillator system 63 can be monitored, and if it drifts outside of a programmed frequency range, the frequency of OSCLK can be adjusted back to the center of the desired range. (This adjustment is only for unexpected situations. Normally, such adjustment is not needed because the ASRC in block 30-1 will operate over the drift range of OSCLK.) The drift referred to is the problem with having an open loop oscillator generating a clock signal for analog DAC 35. To correct that problem, SRC 32 monitors the clock rate of analog DAC 35 by using REFCLK as the reference and therefore "knows" what the sample rate fsout for the audio data is, and automatically converts the original audio data sample rate fsin into the sample rate at which analog DAC 35 is operating. This prevents any drift or "tone shifting" of the audio output signal Vout produced by analog DAC 35 due to drift of the frequency of OSCLK.

There are two data transfer protocol modes for audio DAC system 10, including an "N-SAMPLE mode" and an "interrupt mode". In the "N-SAMPLE mode", audio serial bus interface 12 is programmed by DSP 110, via the I²C bus (or other control bus), to accept a number N of DIN audio samples from DSP 110 for each burst, and then stop responding to DSP 110 for a short period of time to allow DSP 110 to "cleanly" stop the audio interface clock signals WCLK and/or BCLK to audio DAC system 10 after the N-sample DIN transfer if DSP 110 is in control of audio serial bus interface 12. Then audio DAC 30 in FIG. 1 is ready to accept the next batch of N audio samples. If audio DAC 30 is in control of the transfers of the N samples of DIN to audio serial bus interface 12, it will stop the N-sample transfer after the programmed number N of audio samples has been received by audio serial bus interface 12. The transfer of the next group of DIN samples from DSP 110 to audio serial bus interface 12 is triggered by a command sent to DAC 30 from DSP 110.

In the "interrupt mode", there is no specified number of samples for each burst of DIN samples. Instead, the number of DIN samples transferred during each burst is determined by the number of audio samples remaining in FIFO system 15. If DSP 110 is in control of the timing of the DIN sample bursts, i.e., if DSP 110 is the "master" of audio serial bus interface 12, then audio serial bus interface 12 always accepts the DIN samples as long as there is no overflow thereof in FIFO system 15. However, if audio DAC 30 is the "master", then audio DAC 30 will stop requesting DIN samples when the number of audio samples remaining in FIFO system 15 reaches a maximum level, and will request more DIN samples when the number remaining in FIFO system 15 falls below a minimum.

Asynchronous SRC 32 operates in response to a given DAC operating clock rate ($128f_s$out in this example) reference clock SLEEPCLK, and the known ratio of the audio data sampling rate fsin to the rate of reference clock SLEEPCLK to convert the audio data Din (FIG. 2) from its original sampling rate fsin to the DAC operating rate $128f_s$out. To reduce its complexity, asynchronous SRC 32 should be operating at a higher sampling rate than the interpolation filter 31. Interpolation filter 31 is normally required in audio DAC 30 along with digital delta-sigma modulator 34 to achieve further improved performance.

The data flow in audio DAC 30 with asynchronous sampling rate converter 32 is shown in FIG. 2. The transfer functions $H1(z)$, $H2(z)$, $H3(z)$ and $H4(z)$ in interpolation filter 31 are combined to up-sample the audio data up by 32 before feeding it to asynchronous SRC 32. Asynchronous SRC 32 changes the sampling rate from $32f_s$in to the $32f_s$out operating rate of audio DAC 30. Zero order hold filter 33A, with transfer characteristic $H5(z)$ up-samples the data from 32fsout by 4, to 128fsout. The audio data word length then is reduced by multi-bit delta-sigma modulator 34 before feeding the result to analog audio DAC 30.

To achieve the best performance, free-running oscillator system 63 should be calibrated before beginning operation of audio DAC 30. Free-running oscillator system 63 is automatically calibrated after it is powered up along with power-up of audio DAC system 10. During the calibration, the output frequency of OSCLK is adjusted into the range of the desired frequency based on reference clock SLEEPCLK and the ratio of oscillator clock frequency relative to the frequency of SLEEPCLK. The calibration process is performed for a certain number of the cycles of SLEEPCLK. Once the calibration is completed, the logic blocks of audio DAC system 10 begin operating and asynchronous SRC 32 converts the sampling rate of the Din audio samples to $128f_s$out.

Figure 5:
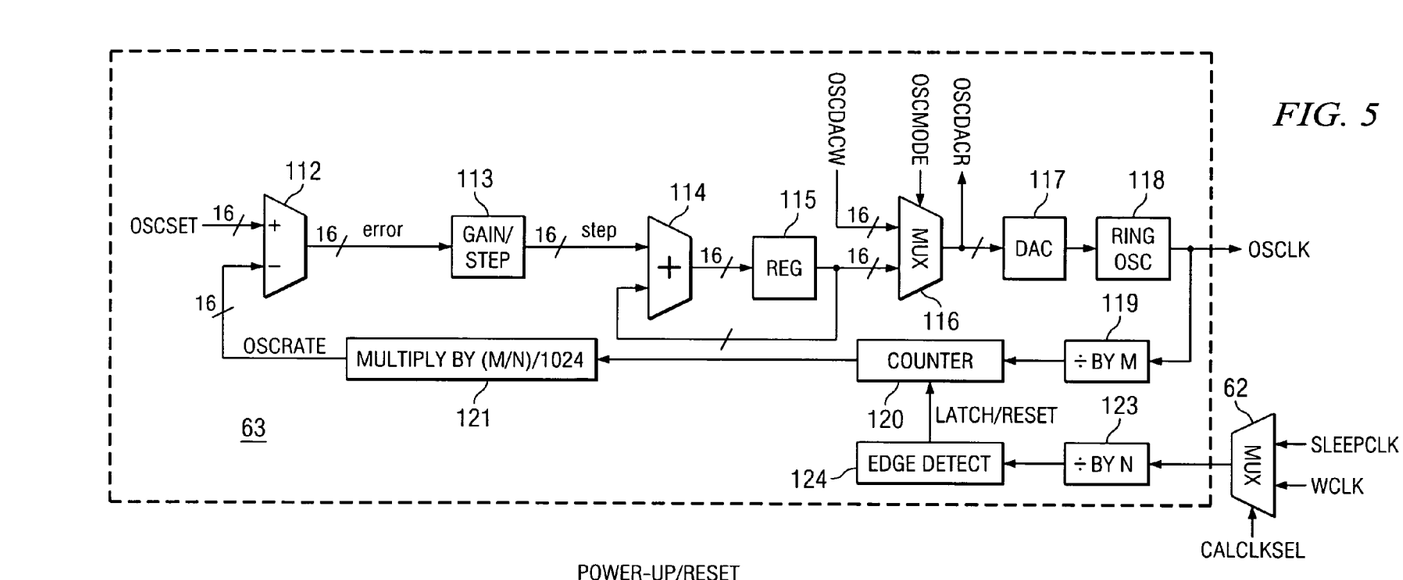
FIG. 5 is a block diagram including oscillator and oscillator calibration circuitry included in block 63 of FIG. 3.

Referring to FIG. 5, oscillator system 63 includes a digital comparator 112 having a (+) input receiving a 16-bit signal OSCSET, which represents the ratio of the divided-down oscillator output signal rate to the reference clock frequency (which is the selected one of SLEEPCLK or WCLK). OSCSET is equal to (frequency of OSCLK)/(frequency of selected reference clock)/1024 in the presently described example. The 16-bit output of digital comparator 112 is coupled to the input of a GAIN/STEP circuit 113, which performs the function of scaling "error" to generate the adjustment step for the input of the DAC during calibration and to generate the single positive or negative step based on the sign of error during the adjustment state. The DAC output level controls the OSC output clock rate. GAIN/STEP circuit 113 produces a 16-bit output which is applied to one input of digital adder 114, which produces a 16-bit output signal that is applied to the input of a 16-bit register 115. The 16-bit output of register 115 is fed back to another input of digital adder 114, whereby adder 114 and register 115 form an accumulator, the output of which is applied to one input of a digital multiplexer 116. The other input of digital multiplexer 116 receives a 16-bit signal OSCDACW from a control register (not shown) which is set up by DSP 110. If the calibration time is set to zero, OSC-DACW will be loaded into register 115 and drive DAC 117 and cause immediate free-running operation of oscillator system 63. A selection input signal OSCMODE is applied to a selection input of digital multiplexer 116.

The output of digital multiplexer 116 is a 16-bit signal OSCDACR which is applied to the input of a DAC 117 and it can be read back by DSP 110 through the control interface 27. The analog output DAC 117 is applied to the input of a ring oscillator 118. The output of ring oscillator 118 is the oscillator clock signal OSCLK shown in FIGS. 1 and 3, which is applied to the input of a divide-by-M circuit 119. The output of divide-by-M circuit 119 is applied to the input of a counter 120, another input of which receives a signal latch/reset. The output of counter 120 is scaled by a scaler 121 which scales the output of counter 121 by (M/N)/1024 to produce the above mentioned 16-bit digital output signal OSCRATE applied to the (−) input of digital comparator 112. The latch/reset signal is produced by an edge detection circuit 124 which detects edges of the output of a divide-by-N circuit 123. The input of divide-by-N circuit 123 is connected to the output of multiplexer 62 of FIG. 3. The clock signals SLEEPCLK and WCLK are applied to the inputs of multiplexer 62. The reference clock selection signal CALCLKSEL selects one of SLEEPCLK and WCLK to be the external reference clock for audio DAC system 10 of FIG. 1.

When audio DACs system 10 is powered up, it goes through the calibration procedure automatically. Initially, the user has to provide OSCSET (4 bits representing the integer portion and 12 bits representing the fractional portion), which is a value of the ratio of the oscillator output OSCLK to the selected reference clock frequency (either SLEEPCLK or WCLK). Counter 120 counts how many pulses of OSCLK are produced by ring oscillator 118 after that number has been divided by M. The reference clock from multiplexer 62 is divided by N. Digital comparator 112 determines if the scaled oscillator frequency OSCRATE is greater than or less than OSCSET. The error signal produced by digital comparator 112 is subjected to the gain/step operation, which controls how much the control signals inside register 115 are updated. If the value of the error after the gain/step operation is positive, that means the frequency of OSCLK needs to be increased and the value inside accumulator 114,115 will increase. This process continues for a predetermined number of pulses sufficient to cause OSCRATE to closely match OSCSET, and then the calibration procedure automatically stops and allows ring oscillator 118 to run freely. A similar procedure is performed if the value of the error after the gain/step operation is negative.

Figure 6:
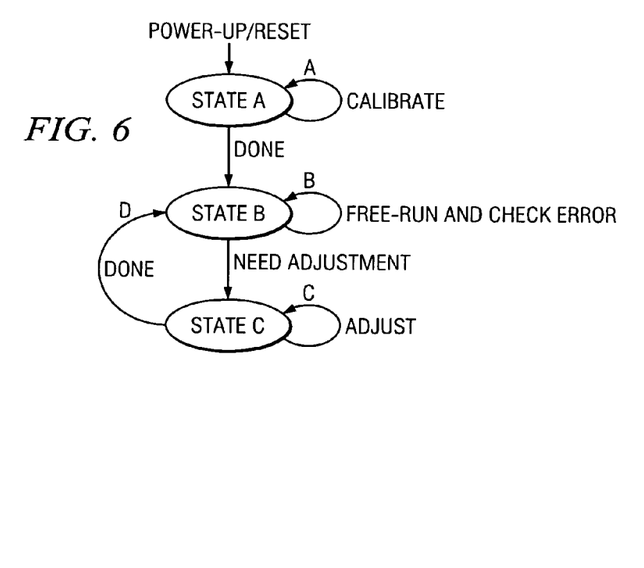
FIG. 6 is a diagram of a state machine for the oscillator calibration system shown in FIG. 5.

FIG. 6 shows a state diagram of oscillator and oscillator calibration system 63 of FIG. 5, which includes three states, State A, State B and State C. A power-up signal RESET causes calibrated oscillator system 63 to enter into State A, during which calibration of OSCLK is performed, as indicated by loop A. When the initial calibration is complete, the state diagram goes to a State B and, as indicated by loop B, ring oscillator 118 continues oscillating at the calibrated frequency, and the circuit loop shown in FIG. 5 keeps checking the magnitude of the error at the output of comparator 112. If the magnitude of error exceeds a predetermined threshold, the state diagram goes to State C, performs the amount of adjustment needed, as indicated by C, and then returns to State B, as indicated by path D.

The oscillator and oscillator calibration system 63 is in calibration State A for a predetermined number of reference clock cycles, and then goes to State B. In State B, the system in block 63 continues to check the accumulated error in accumulator 114,115 during free-running operation of ring counter 118. In state C, if the error produced by digital comparator 112 is positive, then accumulator 114,115 accumulates the error values by incrementing accumulator 114,115 by 1 every pre-programmed number of the divided-down reference clock cycles, and if the error is negative, accumulator 114,115 is decremented by 1 every pre-programmed number of the divided-down reference clock cycles. The incrementing or decrementing continues until the oscillator fraction changes unto of the error changes signs, e.g., from positive to negative or from negative to positive, and then the recalibration operation returns to State B.

Multiplexer 116 allows the calibration operation to adjust the oscillator frequency as previously described, or allows the oscillator frequency to be determined by a value which is provided by DSP 110, depending on the multiplexer selection signal OSCMODE.

The above described implementation of the present invention differs substantially from the prior art in that audio DAC 30 is clocked only in response to free-running oscillator system 63 on the same chip with asynchronous SRC 32, and also differs from the prior art by the burst mode transfer of the serial audio data DIN into FIFO system 15 during power-up mode operation of DSP 110 and operating DSP 110 in a low power mode at other times. This results in a substantial overall power savings in the combined operation of DSP 110 and audio DAC system 10.

However, it should be understood that not all embodiments of the invention require use of a free-running oscillator and an asynchronous SRC, or even a synchronous SRC. It would be possible or practical in some instances to use DSP 110 producing the serial digital audio data signal DIN in the burst mode, together with the serial bus interface 12, FIFO system 15 and associated FIFO management circuitry therein, but using a synchronous SRC instead of an asynchronous SRC, or even without using any SRC. What is possible or practical in this regard depends on the nature of the clock used to drive the analog DAC 35. If that clock signal is based on an on-chip free-running oscillator, the frequency of the clock signal OSCLK produced by the free-running oscillator 63 normally drifts with changes in the temperature, changes in the power supply voltage, and changes in the integrated circuit manufacturing process. Because of this, an asynchronous SRC has to be used because the analog DAC operating frequency and the audio data sampling rate can not be represented by a ratio of two integers. But if the relation can be described by a ratio of two integers, only a synchronous SRC is required. For example, if the clock signal driving the analog DAC is generated from a PLL (phase locked loop) the output clock frequency of which is locked to a clock signal having a known frequency, a synchronous SRC can be used. If the PLL-generated clock signal is a direct integer multiple of the audio sampling rate, then no SRC is needed.

Figure 3:
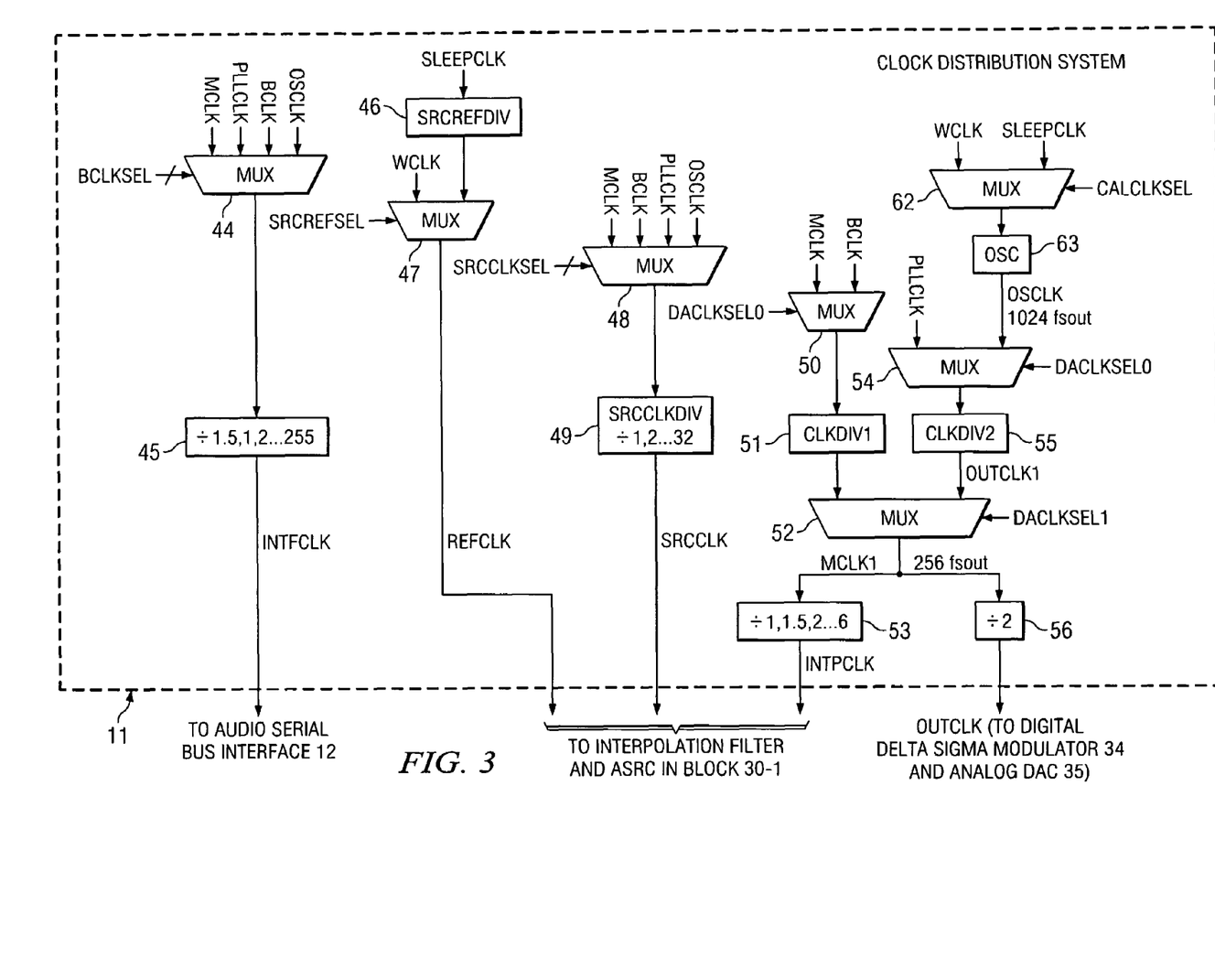
FIG. 3 is a block diagram of the audio clock signal generation and clock signal calibration system in block 11 of FIG. 1.

FIG. 3 shows details of audio clock signal generation and calibration circuitry in block 11 of FIG. 1. Referring to FIG. 3, clock signal distribution system 11 includes first, second, third, fourth, and fifth branches. The first branch of clock signal distribution 11 includes a multiplexer 44 and a divider 45. Multiplexer 44 selects one of clock signals MCLK, PLLCLK, BCLK and OSCLK in response to a select signal BCLKSEL. The various control signals BCLKSEL, CALCKSEL, DACLKSEL etc., are set up in control registers (not shown) in DAC 30 of FIG. 1 by DSP 110, through $I^2C$ control interface 27. The output of multiplexer 44 is connected to the input of a divider 45, which can be set up to divide any of MCLK, PLLCLK or OSCLK by any suitable number such as 1.5, 1, 2 . . . 255. The output of divider 45 produces serial bus interface clock signal INTFCLK, which is applied to a clock input of audio serial bus interface 12, for the case wherein audio serial bus interface 12 functions in its "master mode". (The device driving BCLK and/or WCLK is defined as the "master" and the device receiving such clock signals is defined as the "slave".)

A second branch of clock signal distribution system 11 includes a SRC reference clock signal divider circuit 46 which can be set up to divide the reference clock signal SLEEPCLK by any suitable number such as 1, 2 . . . 8, and the result is applied to one input of multiplexer 47. The other input of multiplexer 47 is connected to receive word clock WCLK. A reference clock selection signal SRCREFSEL is connected to a selection input of multiplexer 47, the output of which generates the reference clock REFCLK. REFCLK is connected to a reference clock input of interpolation filter 31 and asynchronous SRC 32, as shown in FIGS. 1 and 2. Typically, REFCLK is exactly equal to SLEEPCLK, but, WCLK can be selected as the reference clock REFCLK if desired.

The third branch of clock distribution system 11 includes a multiplexer 48 which receives the clock signals MCLK, BCLK, PLLCLK, and OSCLK, which are selectable in response to an SRC clock selection signal SRCCLKSEL to produce an output signal which is applied to the input of SRC clock divider circuit 49. SRC clock divider circuit 49 can be set up to divide the selected clock signal by any suitable number such as 1, 2 . . . 31, 32 to produce a clock signal SRCCLK, which is applied to asynchronous SRC 32 in block 30-1, as shown in FIGS. 1 and 2.

The fourth branch of clock distribution system 11 includes a multiplexer 50 which receives MCLK and BCLK. A DAC clock selection signal DACLKSEL0 selects one of them as a multiplexer output signal that is applied to a clock divider circuit 51. The output of clock signal divider circuit 51 is applied to one input of a multiplexer 52, the output of which is connected to the input of a clock divider circuit 53 and another clock divider 56. Divider circuit 53 can be set up to divide the selected MCLK or BCLK signal by any suitable number such as 1, 1.5, 2 . . . 6 to provide a clock input INTP which is applied to asynchronous SRC 32 in block 30-1, and the output of clock divider 56 is applied to analog DAC 35, as shown in FIGS. 1 and 2. OUTCLK also is applied as an input to FIFO system 15.

The fifth branch of clock distribution system 11 includes multiplexer 62 and the above mentioned free-running oscillator system 63 which produces OSCLK. Multiplexer 62 receives SLEEPCLK and WCLK, one of which is selected in response to the reference frequency selection signal CAL-CLKSEL. At this point, it should be appreciated that the audio DAC user typically requires a high accuracy of the audio play back rate, which can not be guaranteed because of the above mentioned thermal drift of free-running oscillator system 63 The drift typically is caused by the environment temperature change. For example, the integrated circuit chip becomes hotter after audio DAC system 10 runs for a while and therefore increases the frequency of oscillator system 63 Furthermore, the supply voltage level produced by a battery decreases after being used for a while, which also increases the frequency of oscillator system 63 Consequently, the frequency of OSCLK is not exactly the same rate as the sample rate of the incoming audio data. Audio DAC system 10 uses SRC 32 to convert the fixed audio input sample rate 32$f$sin to an asynchronous audio output sample rate 32$f$sout, and plays the audio output data at the 128$f$sout rate derived from the drift-prone signal OSCLK, which in this example has a nominal frequency of 1024$f$sout.

The above-mentioned fifth branch of clock distribution system 11 applies OSCLK to one input of a multiplexer 54, the other input of which receives PLLCLK. The signal DACLKSEL0 selects one of them and applies it to the input of a second clock divider circuit 55. The output OUTCLK1 of second clock divider circuit 55 is connected to another input of multiplexer 52, which selects one of its two inputs in response to DAC clock selection signal DACLKSEL1. The output of multiplexer 52 produces MCLK1 which is applied to the input of divider 53 and divider 56. In one embodiment of the invention, divider 53 and simply divides by 1, producing INTPCLK at the same frequency as MCLK1 and applying it to interpolation filter and ASRC 32, as shown in FIGS. 1 and 2, and divider 56 divides by 2 to produce the clock signal having a frequency 128$f$sout which is applied to digital deltasigma modulator 34 and analog DAC 35 (FIG. 2).

Figure 4A:
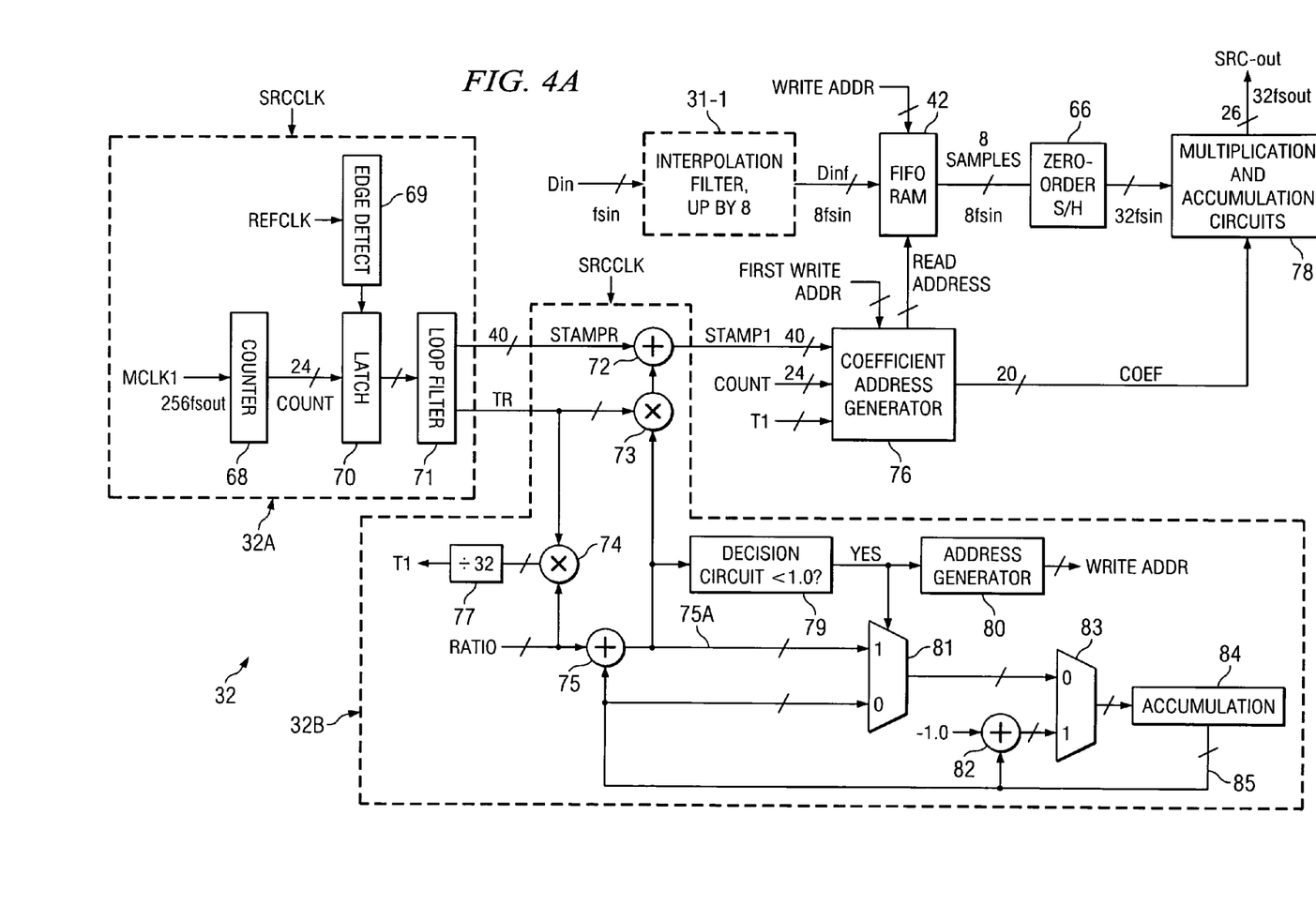
FIG. 4A is a detailed block diagram of an ASRC included in block 32 of FIG. 2.

FIGS. 4A and 4B show details of block 30-1 in FIG. 1. Referring to FIG. 4A, asynchronous SRC 32 includes a counter 68 which operates to produce a signal COUNT in response to a master clock signal MCLK1, the frequency of MCLK1 being equal to 256$f$sout. MCLK1 is derived from on-chip oscillator system 63 and is generated at the output of multiplexer 52 in FIG. 3. Counter 68 continues to repeatedly count to its overflow condition. The rising edge of REFCLK latches the content of counter "COUNT" into loop filter 71. The signal COUNT represents the time of arrival of, for example, the rising edge of REFCLK in terms of the MCLK1 cycle as the counting unit, and is applied to a data input of a latch 70. Latch 70 has a clock input coupled to the output of an edge detection circuit 69, which detects a rising edge of the reference clock signal REFCLK. The output of latch 70 is applied to an input of a loop filter circuit 71, one output of which produces a "time stamp" signal STAMPR. STAMPR is applied to one input of an adder 72. (Loop filter 71 is similar to one disclosed in the assignee's the pending patent application, Publication No. US 2004/0120361 A1.) Time stamp signal STAMPR is a low-pass filtered version of COUNT, and represents the arrival time of the rising edge of REFCLK, with the jitter of REFCLK attenuated and with better resolution of its time of arrival. Another output of loop filter circuit 71 produces a signal TR, which represents the estimated period of REFCLK, measured in units of the clock cycle of MCLK1. The signal TR is applied to one input of a multiplier 73 and also to one input of another multiplier 74.

The combination of edge detect circuit 69, counter 68, latch 70, and loop filter 71 can be considered to constitute an estimating circuit 32A that generates TR and STAMPR.

A constant value RATIO, which is equal to the ratio between the known frequency of reference clock REFCLK and the basic audio input sampling rate fsin, is applied to another input of multiplier 74 and is also applied to one input of an adder 75. (Therefore, RATIO also is approximately equal to (1/TR)/fsin.) The output of multiplier 74 is connected to the input of a divide-by-32 circuit 77, the output of which produces a signal T1 that represents an estimate of the period of 32$f$sin, measured in terms of the clock cycle of MCLK1, by scaling (i.e., multiplying) the estimated period TR of REF-CLK by the value RATIO. Adder 75 produces an output signal 75A on conductor 75A. Conductor 75A is connected to another input of multiplier 73, an input of a decision circuit 79, and the "1" input of a multiplexer circuit 81. The output of decision circuit 79 is connected to a select input of multiplexer 81 and also to an input of an address generation circuit 80, the output of which produces a write address signal WRITE ADDR that is connected to a write address input of FIFO memory 42. When the value of the signal YES produced by decision circuit 79 is a logical "1", the output of multiplexer 81 is selected to be equal to the value of its input signal 75A. The output of multiplexer 81 is connected to the "0" input of a multiplexer circuit 83, an output of which is connected to an input of a register or accumulator 84. The output 85 of accumulator 84 represents the time interval between the last audio sampling data to be played and the last REFCLK arrival in units of the interval of REFCLK, and is coupled by conductor 85 to another input of adder 75, the "0" input of multiplexer 81, and to one input of an adder 82. The other input of adder 82 is connected to receive a signal "−1.0".

The combination of adders 72 and 75, multipliers 73 and 74, decision circuit 79, multiplexers 81 and 83, and accumulator 84 may be considered to be another estimating circuit 32B that performs the function of generating the signal STAMP1 and also generating its period T1, which is a precise estimate of the provided value of $32f_s$in, as a function of RATIO, which represents the ratio between the frequency of REFCLK and the input audio sampling rate or frequency fsin, and also indirectly represents the operating rate $128f_s$out of the analog DAC. As previously mentioned, the signal T1 represents an estimated audio input sampling period of $32f_s$in measured in terms of the clock cycles of MCLK1, and is generated by multiplying the estimated period TR of REFCLK by the ratio value RATIO. Estimating circuits 32A and 32B both are clocked by the operating clock signal SRCCLK subsequently described with reference to FIG. 5.

It should be appreciated that normally the user of the audio DAC knows the frequency of REFCLK, and also knows exactly the desired input audio input sample rate fsin. In order to accurately use the frequency of REFCLK to estimate fsin, the user can provide the precise ratio of the frequency of REFCLK relative to fsin. The free-running oscillator output signal OSCLK is divided down to produce the clock MCLK1, and is also used to generate the audio output sampling rate $128f_s$out which controls the operating rate of analog DAC 35. Therefore, MCLK1 is also related to fsout, and is advantageously used to drive the counter 68 with MCLK1. Since REFCLK latches the output of counter 68, the relation between the precisely estimated input sample rate period T1 of $32f_s$in and the output sample rate $128f_s$out, which is proportional to fsout, is known.

The output of multiplier 73 is connected to another input of adder 72, which produces a time stamp signal STAMP1 that is applied to an input of a coefficient address generator circuit 76, which is shown in FIG. 4A. The time stamp signal STAMP1 represents the time stamp or arrival time of the first sample of 8 audio output samples of interpolation filter 31 (the sample rate of which is $8f_s$in) to provide a signal having an output sample rate of $8f_s$in to be coupled to an input of FIFO memory 42 of SRC 32. The output of FIFO memory 42 then is up-sampled by a factor of 4 by zero order sample/hold circuit 66. The signals COUNT and T1 are applied to two additional inputs, respectively, of coefficient address generator 76. A first write address signal FIRST WRITE ADDR is applied to an input of coefficient address generator 76 and also to an input of FIFO memory 42. FIRST WRITE ADDR is the write address of the first sample of each group of 8 samples of data produced by interpolation filter 31.

An output of coefficient and address generator 76 conducts a 20-bit coefficient signal coef which is provided as an input to multiplication and accumulation circuit 78. FIFO memory 42 outputs data samples, at the rate $8f_s$in, to the input of a zero-order sample/hold (ZOS/H) circuit 66, the output of which provides samples at the rate of $32f_s$in to a data input of multiplication and accumulation circuit 78. The 26-bit output signal SRC-out produced by multiplication and accumulation circuit 78 has a $32f_s$out sample rate.

Figure 4B:
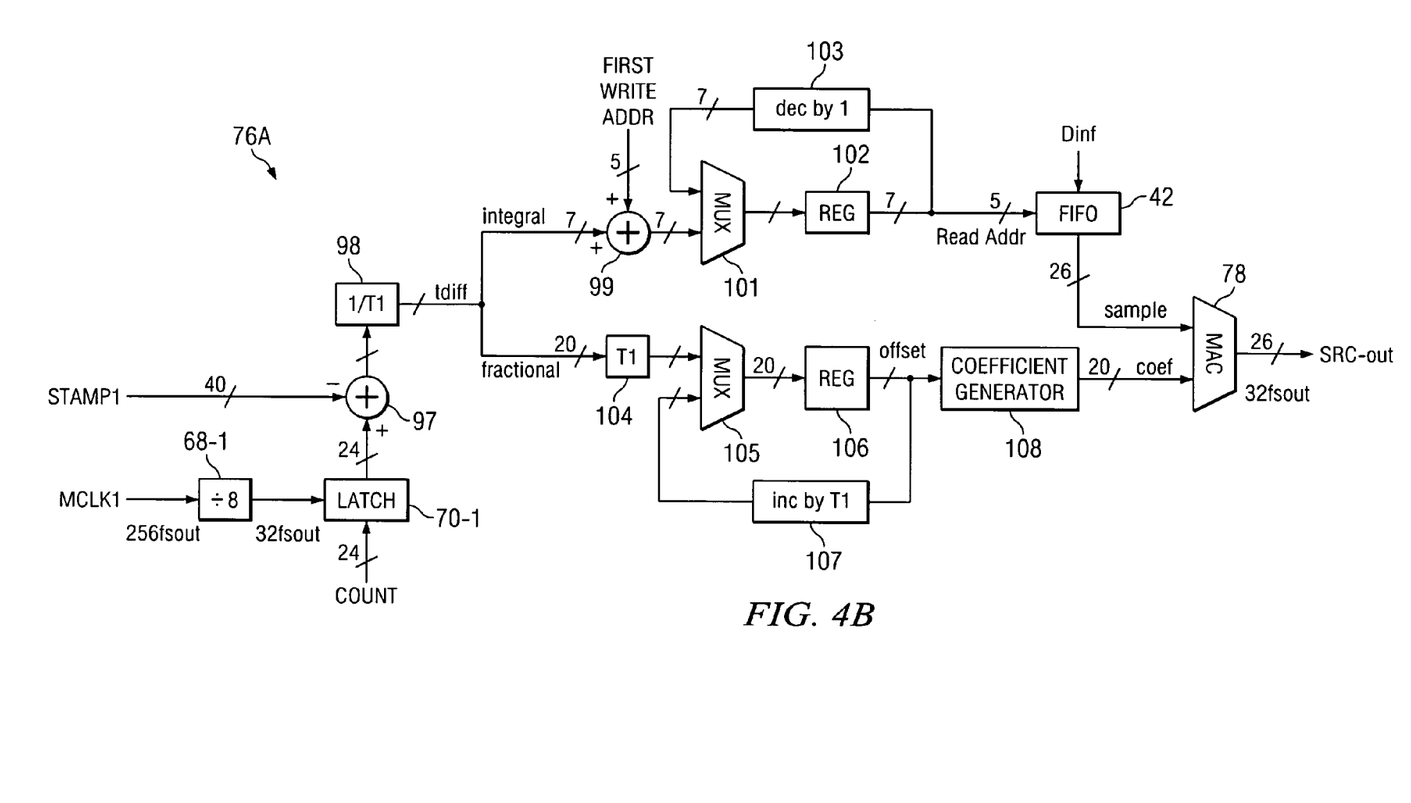
FIG. 4B is a detailed block diagram including circuitry of the coefficient address generator in block 76 of FIG. 4A.

Referring to FIG. 4B, SRC filtering circuitry 76A includes the coefficient and address generator circuitry in block 76, FIFO 42, and multiplication and accumulation circuit (MAC) 78 of FIG. 4A. The coefficient and address circuitry portion includes a divide-by-8 circuit 68-1 which receives MCLK1 as an input and generates an output to the latching input of a 24-bit latch circuit 70-1. Latch circuit 70-1 also receives COUNT as an input. A 24-bit output of latch circuit 70-1, which represents the current time, is applied to the (+) input of an adder 97, the (−) input of which receives the 40-bit signal STAMP1 produced by loop filter 71 of FIG. 4A. The output of adder 97 is coupled to the input of a circuit 98 which divides the output of adder 97 by the value of the quantity T1 produced by multiplier 74 in FIG. 4A to produce the signal tdiff.

The output tdiff of circuit 98 represents, in essence, the timing difference between the corresponding audio input signals having $32f_s$in sample rates and audio output signals having $32f_s$out sample rates. The time difference signal tdiff includes a 7-bit integral portion applied to the (+) input of an adder 99 and a 20-bit fractional portion coupled to the input of a multiplier circuit 104 which multiplies the fractional portion by T1. Another (+) input of adder 99 receives the 7-bit FIRST WRITE ADDR signal. The 7-bit output of adder 99 is coupled to one input of multiplexer 101. The output of multiplexer 101 is connected to the input of a register 102. The most significant 5 bits of the 7-bit output of register 102 are connected to the read address input of FIFO memory 42. All 7 output bits of register 102 are fed back to the input of a decrement by 1 circuit 103, the 7-bit output of which is connected to another input of multiplexer 101. As previously mentioned, the input of FIFO memory 42 receives the digital input signal Dinf produced by interpolation filter 31 of FIG. 4A. The 26-bit output of FIFO memory 42 is connected to one input of MAC circuit 78 (i.e., multiplication and accumulation circuit 78), the output of which produces the signal SRC-out at a sample rate of $32f_s$out.

The output of multiplier 104 is applied to one input of multiplexer 105, the 20-bit output of which is connected to the input of a register 106. The output of register 106 is coupled to the input of a coefficient generating circuit 108 and to the input of an increment-by-T1 circuit 107, the output of which is connected to another input of multiplexer 105. Coefficient generator circuit 108 produces a 20-bit output coef which is applied to the other input of MAC circuit 78.

Divider 68-1 and latch 70-1 establish the sample rate of the SRC output signal SRC-out produced by SRC 32. The signal latched into latch 70-1 can be considered to represent the current time, if counter 68 in FIG. 4A is considered to be a timer. The difference between the 24-bit output of latch 70-1 and the value of the 40-bit time stamp signal STAMP1 then is divided by T1 to produce the above mentioned timing difference signal tdiff.

Still referring to FIG. 4A, the sum of the FIRST WRITE ADDRESS and the integral portion of timing difference signal tdiff is multiplexed into register 102, to be used in the filtering of an initial sample of the digital input data Dinf. For a second sample of Dinf to be filtered, the output of register 102 is decremented by 1 and then multiplexed back into register 102. The read address is determined by adding the FIRST WRITE ADDR signal to the integral portion of tdiff and result is entered into register 102, and the following read address is decremented by 1. The read address produced at the output of register 102 is obtained by dropping the two LSBs (least significant bits) of the contents of register 102 to convert from 7-bit write address words to 5-bit read address words that are used to read out audio data samples from FIFO memory 42.

Meanwhile, 20-bit coefficients (i.e., values of the signal "coef") are being generated at the same time. The 20-bit fractional portion of the timing difference tdiff is multiplied by T1 (the estimated period of $32fsin$) and that result is multiplexed into register 106. The output signal "offset" of register 106 is input to coefficient generator 108, which calculates points of a coefficient generating function curve, for example as shown in FIG. 4C the above-mentioned incorporated-by-reference pending application Ser. No. 11/726,414 and also is incremented by T1 and fed back to the other input of multiplexer 105. The function h(t) described therein is utilized to generate the coefficients coef. Subsequent coefficients for successive points of the coefficient generating function curve are generated by incrementing the feedback from register 106 by the period T1 of $32fsin$.

MAC circuit 78 operates by initially being reset to zero. When the first filtered audio sample of Dinf is received out of FIFO memory 42, it is multiplied by the first coefficient from coefficient generator 108. That result is added to the previous value in MAC circuit 78, the initial previous value being zero, to generate the first value accumulated in MAC circuit 78. Then, the next audio data sample out of FIFO memory 42 is multiplied by the next value of coef and the result is added to, i.e., accumulated with, the previous value in MAC circuit 78 to produce the next accumulated value, and so on, until 8 Dinf samples from FIFO memory 42 have been multiplied by corresponding coefficients coef from coefficient generator 108 and then accumulated.

The final value accumulated in MAC circuit 78 then is output as the next value of the 26-bit SRC digital output signal SRC-out, with a sample rate $32fsout$.

It should be appreciated that the read address generation and coefficient generation circuitry is clocked by MCLK1, so for an output sample rate of $32fsout$ there are 8 MCLK1 clock cycles for the 8 audio data samples successively output by FIFO memory 42 and processed by MAC circuit 78 to generate each value of SRC-out.

An interpolation flow chart shown in FIG. 4D of the above-incorporated-by-reference pending application Ser. No. 11/726,414, shows how the information and samples of Dinf are set up to accomplish the sample rate conversion which occurs in the circuitry of FIGS. 4A and 4B.

When a rising edge of REFCLK arrives, −1.0 is added into accumulator 84. Otherwise, when an audio sample is played, the positive number RATIO is added into accumulator 84 until the content of accumulator 84 approaches but is not above 1.0. When the content of accumulator 84 exceeds 1.0, "playing" of the audio samples stops and waits for the arrival of a positive edge of REFCLK. When it arrives, 1.0 is subtracted from the content of accumulator 84 and then playing of the audio sample data continues. The output of adder 82 indicates that 1.0 has been subtracted from the content of accumulator 84, and is connected to the "1" input of multiplexer circuit 83.

A signal FIRST WRITE ADDR is applied to another input of coefficient address generator 76 and to a write address input of a first FIFO (first in, first out) memory 42, which can be implemented by means of a random access memory (RAM). The signal FIRST WRITE ADDR is generated whenever a sample is generated by the interpolation filter 31 continuously with 5 bits (for a total 32 word memory space, for example, 0, 1, 2, . . . , 31.)

A digital data input signal Din is applied to an input of interpolation filter 31-1, and is up-sampled by a factor of 8. An output of interpolation filter 31-1 produces a higher input sampling rate $8fsin$ which is applied to a data input of FIFO memory 42. Coefficient address generator circuit 76 produces a read address signal READ ADDRESS, which is applied to a corresponding read address input of FIFO memory 42. During a read operation, FIFO memory 42 produces a sample output signal SAMPLES of a total of 8 samples at the output of up by 4 zero-order sample/hold circuit 66 are used to calculate each SRC output sample. So equivalently, 2 samples from FIFO memory are used, which is applied to an input of multiplication and accumulation circuitry 78. A coefficient output signal coef produced by coefficient address generator 76 is applied to a corresponding input of multiplication and accumulation circuitry 78, the output of which produces the output of asynchronous SRC 32, with a sample rate of $32fsout$. (Multiplication and accumulation circuit 78 is conventional and can be readily implemented by those skilled in the art.)

At each rising edge of reference clock signal REFCLK, the output COUNT of counter 68 is latched, and the latch output is provided as an input to loop filter 71. Counter 68 is driven by above mentioned master clock signal MCLK1, which is derived from the same free-running on-chip oscillator 63 that also clocks analog DAC 35. Loop filter 71 estimates the frequency of reference clock REFCLK and filters out jitter. Then the value RATIO of the ratio between the frequency of REFCLK and the frequency of fsin is used to calculate period of the audio input sampling rate $32fsin$ and the sampling time STAMP1 based on outputs of loop filter 71, which are related to the frequency of REFCLK. In this example of the present invention, and as explained with respect to FIG. 3, MCLK1 is set equal to $256fsout$. The rate of REFCLK is estimated from the loop filter by low-pass filtering REFCLK by using MCLK1. The relation between REFCLK and the incoming audio sampling rate fsin is given by their frequency ratio, RATIO. Based on these relations, SRC 32 converts the audio samples from $32fsin$ to $32fsout$ Decision circuit 79 determines whether to start operation of interpolation filter 31 by subtracting 1.0 from the content of decision circuit 79, and if the sum of the accumulator content and the value of the constant value RATIO is less than 1.0, then the determination is affirmative, and the sum is stored into decision circuit 79 and the operation of interpolation filter 31 is started. As explained with reference to FIG. 3, the output sample frequency $128fsout$ is determined by the rate of free-running oscillator 63, which controls the operating rate of analog DAC 35. At the very beginning of the system startup, the oscillator frequency typically will be calibrated to approximately 50 MHz. Since the oscillator calibration may not be accurate, and since oscillator 63 free-runs after calibration, the output sampling rate $128fsout$ derived from oscillator 63 is approximately, but not exactly, equal to the analog DAC target rate of $128fsin$, which is 128×48 kHz. SRC 32 asynchronously translates the audio input sample rate from $32fsin$ to the output sampling rate $32fsout$ by, in effect, comparing the frequency of OSCLK against the frequency of REFCLK and, in effect, comparing the ratio settings for the audio data sampling rate ratio value RATIO against the frequency of REFCLK. This is how SRC 32 converts the sample rate from $32fsin$ to $32fsout$ by estimating the ratio of the frequency of REFCLK relative to fsout, so that the relationship between fsin and fsout is known because of the known ratio between REFCLK and fsin.

8 samples then are generated at the output of interpolation filter 31 and are transferred to FIFO memory 42. Then the necessary multiplication and accumulation operations are applied to the samples by circuitry in block 78 to generate the SRC output samples at the rate of $32f_s$out. The calculation of the period T1 of the input sampling rate fsin is determined by the contents of counter 68. However, if the sum in decision circuit 79 is equal to or greater than 1.0, the logic circuitry including coefficient address generator 76, address generator 80, FIFO memory 42, and all of the circuitry in FIG. 4A except the coefficient and address generator 76 and the multiplication and accumulation circuitry 78 remain idle until the next pulse of REFCLK arrives.

A clock signal such as REFCLK, which has no relationship to the audio input sample rate fsin, in conjunction with the asynchronous SRC 32, to control the analog DAC 35. That is in direct contrast to the prior art, in which the clock signal that controls the analog DAC portion of an audio DAC is directly related to the input audio sampling rate fsin.

The present invention allows one or more audio DACs to play back one or more audio input signals having different audio sample rates without causing the previously described sample dropping or sample repeating of the audio output, even though the reference clock frequency is not locked in synchronization with the sampling rate of the audio output data, while using substantially less power than the prior art.

The advantages of the present invention include reduced power consumption along with improved quality of the audio signal, relatively easy implementation of the interpolation circuitry in the SRC, and making utilization of audio DACs easier than the prior art by avoiding the need for the audio DAC operating frequency to be locked in synchronization with the input sample rate fsin of the audio input data, and furthermore the reference signal related to the audio input data sample rate fsin does not have to be exactly the same as the audio input sample rate. Instead, any rate of its can be used as long as the ratio of the reference signal frequency to the audio sample rate fsin is provided as an input.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. A low-power data conversion system for converting a serial digital data input signal to an analog output signal, comprising:
    (a) a digital processor, the digital processor generating the serial digital data input signal in a burst mode;
    (b) a serial interface circuit for converting the serial digital data input signal from serial format into parallel format, the digital processor being in a high power mode while generating the serial digital data input signal in the burst mode, the digital processor being in a low power mode during at least some of the time during which the digital processor is not generating the serial digital data input signal;
    (c) a FIFO (first in, first out) system for receiving and temporarily storing a predetermined number of samples of the parallel format digital data input signal, the samples having a first sample rate;
    (d) an audio DAC coupled to receive the samples having a second sample rate and convert them to the analog output signal; and
    (e) a clock generation system which establishes timing of various clock signals for the serial interface circuit, the FIFO system, and the audio DAC, the first sample rate being established by a predetermined ratio between an external reference clock rate and the first sample rate.

2. The low-power data conversion system of claim 1 including an SRC (sample rate converter) coupled to sequentially receive the samples having the first sample rate from the FIFO system and operative to reproduce them as samples with the second sample rate.

3. The low-power data conversion system of claim 2 wherein the clock generation system includes a free-running oscillator which establishes the timing of the various clock signals for the serial interface circuit, the FIFO system, the SRC and the audio DAC.

4. The low-power data conversion system of claim 3 wherein the FIFO system includes a first FIFO memory and is coupled to the serial interface circuit, the FIFO system, and the SRC for notifying the serial interface circuit when to transfer groups of a predetermined number of samples of the serial digital data input signal to the FIFO system.

5. The low-power data conversion system of claim 4 wherein the serial interface circuit accepts the predetermined number of samples of the serial digital data input signal from the digital processor and transfers the accepted samples to the FIFO system for each burst and then temporarily stops accepting those samples.

6. The low-power data conversion system of claim 5 including an interpolation circuit coupled between the SRC and the FIFO system, wherein when the interpolation circuit needs more of the samples in parallel format it sends a need sample signal to the FIFO system, and wherein the interpolation circuit up-samples the samples in digital format to produce a signal having a third sample rate as an input to the SRC.

7. The low-power data conversion system of claim 6 including a volume control circuit coupled between the interpolation circuit and the FIFO system.

8. The low-power data conversion system of claim 3 wherein the free-running oscillator system is calibrated to an external reference signal which can be either synchronous or asynchronous with respect to the serial data input signal.

9. The low-power data conversion system of claim 8 wherein the digital processor is capable of presenting the serial digital input data signal in a continuous mode, the low-power data conversion system including means coupled between the serial interface circuit and the SRC for bypassing the FIFO system if the digital input data signal is in the continuous mode.

10. The low-power data conversion system of claim 3 wherein the SRC is an asynchronous SRC capable of receiving the samples at the first sample rate, the asynchronous SRC including
    (1) a first estimating circuit receiving a reference clock signal and a first clock signal unrelated to the reference clock signal for generating a first signal in synchronization with the first clock signal and representative of a period of the reference clock signal and for generating a second signal in synchronization with the first clock signal and representative of a time of arrival of a particular edge of the reference clock signal;
    (2) a second estimating circuit for operating on the first signal, the second signal, and an input value which represents a predetermined ratio of the frequency of the reference clock signal divided by the first sample rate to generate a third signal which represents a period of the first sample rate and a fourth signal that represents a time of arrival of a group of sample of the digital input data;

(3) a coefficient and address generation circuit receiving the third and fourth signals for generating a read address signal and a coefficient signal;

(4) a second FIFO memory having an input coupled to receive the digital input signal and a read address input for receiving the read address signal; and (5) a multiplication/accumulation circuit for receiving the coefficient signal and digital data samples output by the second FIFO memory, multiplying the digital data samples output by the second FIFO memory by corresponding coefficients output by the coefficient and address generation circuit, accumulating resulting multiplication products, and producing a digital output signal including accumulated multiplication products and having an output sample rate equal to the second sample rate that is synchronized with the first clock signal.

11. The low-power data conversion system of claim 6 wherein the second sample rate is the third sample rate.

12. The low-power data conversion system of claim 2 wherein the serial digital data input signal is an audio data signal, and wherein the digital processor is a DSP (digital signal processor).

13. The low-power data conversion system of claim 12 including an I²C bus coupled to the DSP and an I²C interface circuit coupled between the I2C bus and various conductors conducting various set-up signals and multiplexer selection signals to effectuate operation of the low-power data conversion system.

14. The low-power data conversion system of claim with 2 wherein the SRC is an asynchronous sample rate converter.

15. A method for reducing power consumption required for converting a serial digital data input signal to an analog output signal, the method comprising:

(a) generating the serial digital data input signal at a first sample rate in a burst mode, wherein the serial digital data input signal has a predetermined rate ratio to an external reference clock signal;

(b) converting the burst mode serial digital data input signal into parallel format, the digital processor being in a high power mode while generating the serial digital data input signal in the burst mode, the digital processor being in a low power mode during at least some of the time during which the digital processor is not generating the serial digital data input signal;

(c) temporarily storing a predetermined number of samples of the parallel format digital data input signal in a FIFO system, the samples having a first sample rate;

(d) converting the samples to an analog output signal; and (e) establishing timing of various clock signals for the serial interface circuit, FIFO system, and audio DAC based on a particular clock signal.

16. The method of claim 15 including reproducing the samples with a third sample rate by means of a SRC (sample rate converter).

17. The method of claim 16 including generating the particular clock signal by means of an on-chip free-running oscillator which is calibrated to an external reference signal.

18. The method of claim 16 including reproducing the samples with a second sample rate by means of an asynchronous SRC (sample rate converter).

19. The method of claim 16 wherein the first sample rate is the second sample rate.

20. A low-power data conversion system for converting a serial digital data input signal to an analog output signal, comprising:

(a) means for generating the serial digital data input signal at a first sample rate in a burst mode, wherein the serial digital data input signal has a predetermined rate ratio to an external reference clock signal;

(b) means for converting the burst mode serial digital data input signal into parallel format, the digital processor being in a high power mode while generating the serial digital data input signal in the burst mode, the digital processor being in a low power mode during at least some of the time during which the digital processor is not generating the serial digital data input signal;

(c) FIFO means for temporarily storing a predetermined number of samples of the parallel format digital data input signal, the samples having a first sample rate;

(d) means for converting the samples to an analog output signal; and (e) means for establishing timing of various clock signals for the serial interface circuit, FIFO means, and audio DAC based on a particular clock signal.

* * * * *

UNITED STATES PATENT AND TRADEMARK OFFICE
CERTIFICATE OF CORRECTION

PATENT NO.        : 7,479,912 B1
APPLICATION NO.   : 11/900760
DATED             : January 20, 2009
INVENTOR(S)       : Shawn Xianggang Yu, Mark S. Toth and Terry L. Sculley

It is certified that error appears in the above-identified patent and that said Letters Patent is hereby corrected as shown below:

On the Title Page, Item (75) Inventors

Please delete "Shawn Xianggang" and change to --Shawn Xianggang Yu.--

Signed and Sealed this

Fifth Day of May, 2009

JOHN DOLL
*Acting Director of the United States Patent and Trademark Office*